(12) United States Patent
Jang et al.

(10) Patent No.: US 6,181,864 B1
(45) Date of Patent: Jan. 30, 2001

(54) OPTICAL FIBER ARRAY MODULE USING SOLDERING AND FABRICATION METHOD THEREOF

(75) Inventors: Woo-Hyuk Jang, Yongin; Byong-Gwon Yoo, Daejeon; Hyung-Jae Lee, Seoul; Tae-Hyung Rhee, Sungnarh, all of (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/133,370

(22) Filed: Aug. 13, 1998

(30) Foreign Application Priority Data

Aug. 14, 1997 (KR) ................................... 97-38925

(51) Int. Cl.[7] ................. G02B 6/00; G02B 6/36
(52) U.S. Cl. ................. 385/137; 385/89; 385/92
(58) Field of Search ................. 385/9, 12–13, 385/15, 26–29, 31–32, 39, 49, 50, 51–52, 88–94, 137; 427/163.2

(56) References Cited

U.S. PATENT DOCUMENTS

| | | | |
|---|---|---|---|
| 4,307,935 | * 12/1981 | Monnier | 385/89 |
| 4,774,122 | * 9/1988 | Adler | 428/156 |
| 5,430,819 | * 7/1995 | Sizer, II et al. | 385/137 |
| 5,500,917 | * 3/1996 | Daniel et al. | 385/92 |

FOREIGN PATENT DOCUMENTS

| | | |
|---|---|---|
| 0645 651 | 3/1995 | (EP) . |
| WO 84/02582 | 7/1984 | (WO) . |
| WO 96 37794 | 11/1996 | (WO) . |

OTHER PUBLICATIONS

English Abstract of Reference JP 61–156,104.
English Abstract of Reference JP 62–267,710.

\* cited by examiner

Primary Examiner—Thong Nguyen
(74) Attorney, Agent, or Firm—Robert E. Bushnell, Esq.

(57) ABSTRACT

A fiber array module using soldering, and a fabrication method thereof, in which the method includes the steps of: forming holes into which optical fibers can be inserted, in a silicon wafer substrate or a ceramic substrate at predetermined intervals, forming a metal layer on the walls of the holes and the entire surface of the substrate, to allow walls of the holes and an entire surface of the substrate to be plated with a solder alloy material; plating the walls of the holes and the entire surface of the substrate with the solder alloy material; inserting metal-coated optical fibers into the holes plated with the solder alloy material; positioning the optical fibers at the centers of the holes using the surface tension of the solder alloy material, by heating the resultant structure; fixing the optical fibers, inserted into the holes of the substrate, to the substrate by pouring epoxy curable by heat or ultraviolet light thereon, to fabricate a fiber array module capable of being accurately attached to an optical waveguide device, and polishing an end of the optical fiber module formed of optical fibers protruding through the holes, to provide optical luminance. Accordingly, the environmental characteristics and reliability of a device package are improved upon the connection of the optical fibers. Also, the fiber array module is simply manufactured, and the ends of loaded optical fibers are easily polished, thus fabricating an inexpensive connection module. Furthermore, the optical fibers are accurately arrayed by self-alignment using the surface tension of the solder material.

30 Claims, 5 Drawing Sheets

OPTICAL FIBER ARRAY MODULE USING SOLDERING AND FABRICATION METHOD THEREOF

CLAIM OF PRIORITY

This application makes reference to, incorporates the same herein, and claims all benefits accruing under 35 U.S.C. §119 from an application for OPTICAL FIBER ARRAY MODULE USING SOLDERING AND FABRICATION METHOD THEREOF earlier filed in the Korean Industrial Property Office on the 14$^{th}$ of Aug. 1997 and there duly assigned Ser. No. 38925/1997.

BACKGROUND OF THE INVENTION

1 Field of the Invention

The present invention relates to an optical fiber array module, and more particularly, to a method of making an accurate optical fiber array by arraying and fixing single-core and multi-core optical fibers to make it easy to connect an optical waveguide device to the single-core and multi-core optical fibers, and a fiber array module.

5 Description of the Related Art

Accurate arrangement of optical fibers is very important for attaching the optical fibers to an optical waveguide device. In the case of the optical waveguide device, the waveguides can be very accurately spaced and arrayed by photolithography. However, it is difficult to accurately arrange single-core and multi-core optical fibers which are attached to this waveguide. In existing methods, the optical fibers are arranged by forming grooves in a plane substrate such as a silicon wafer or a metal plate and fixing the optical fibers in the grooves.

However, an accurate process is required to form a device for fixing the optical fibers using the grooves. Also, when the ends of the optical fibers are polished after the optical fibers are loaded, careful attention is needed because the optical fibers are thin. Furthermore, since the thin optical fibers have a small surface area, they have only a small contact surface when attached to the waveguide device, leading to a weak attachment. These problems deteriorate the overall performance of the waveguide device when the optical waveguide device is packaged.

SUMMARY OF THE INVENTION

To solve the above problems, it is an object of the present invention to provide an optical fiber array module using soldering and a fabrication method thereof, whereby an optical waveguide device can be effectively packaged by accurately arraying optical fibers using the surface tension of solder, facilitating a process for polishing the ends of loaded fibers while simplifying a process for forming a device for fixing the optical fibers, and improving the attachment strength of the surfaces of the optical fibers, arrayed to be attached to the waveguide device, by enlarging the cross-sections of the an arrayed fibers.

Accordingly, to achieve the above object, there is provided a method of manufacturing an optical fiber array module using soldering, comprising the steps of: forming holes into which optical fibers can be inserted, in a silicon wafer substrate or a ceramic substrate at predetermined intervals; forming a metal layer on the walls of the holes and the entire surface of the substrate, to allow the walls of the holes and the entire surface of the substrate to be plated with a solder alloy material; plating the walls of the holes and the entire surface of the substrate with the solder alloy material; inserting metal-coated optical fibers into the holes plated with the solder alloy material; positioning the optical fibers at the centers of the holes using the surface tension of the solder alloy material, by heating the resultant structure; fixing the optical fibers, inserted into the holes of the substrate, to the substrate by pouring epoxy curable by heat or ultraviolet light, to fabricate a fiber array module capable of being accurately attached to an optical waveguide device; and polishing the end of the optical fiber module formed of optical fibers protruding through the holes, to provide optical luminance. It is preferable that the metal of the metal layer is chrome/gold (Cr/Au).

To achieve the above object, there is provided a method of manufacturing a fiber array module using soldering, comprising the steps of: forming holes into which arrayed optical fibers can be inserted, in a metal substrate at predetermined intervals; processing the walls of the holes in the metal substrate; plating the walls of the holes and the entire surface of the substrate with solder alloy material; inserting metal-coated fibers into the holes plated with the solder alloy material; positioning the optical fibers at the centers of the holes using the surface tension of the solder alloy material, by heating the resultant structure, fixing the optical fibers, inserted into the holes of the substrate, to the substrate by pouring epoxy curable by heat or ultraviolet light, to fabricate a fiber array module capable of being accurately attached to an optical waveguide device; and polishing the end of the optical fiber module formed of optical fibers protruding through the holes, to provide optical luminance.

The walls of the holes and the entire substrate are plated with the solder alloy material by either electrolytic plating or electroless plating. The optical fibers inserted into the holes in the substrate are prepared by peeling all coatings off the optical fibers and depositing metal on cladding layers of the optical fibers or by depositing metal on external glass layers of the optical fibers.

The holes in the substrate are perpendicular to the surface of an arranging device or at an angle of 0.1° to 20° with respect to the surface of the arranging device. Also, the holes in the substrate each have a shape selected from the group consisting of a rectangle, a circle, and a polygon. The optical fibers inserted into the holes in the substrate are fibers selected from the group consisting of single-core fibers, multi-core fibers, and ribbon fibers.

To achieve the above object, there is provided a fiber array module manufactured using soldering, comprising: a metal substrate having holes into which optical fibers can be inserted, wherein the walls of the holes and the entire surface of the metal substrate are plated with a metal material; arrayed optical fibers inserted into the holes in the metal substrate and prepared by depositing metal layers on cladding layers or external glass layers exposed by removing all coatings from the optical fibers; and a fixing unit for fixing the arrayed optical fibers to the metal substrate, after the arrayed optical fibers are inserted into the holes in the metal substrate and aligned by heat.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 7A:
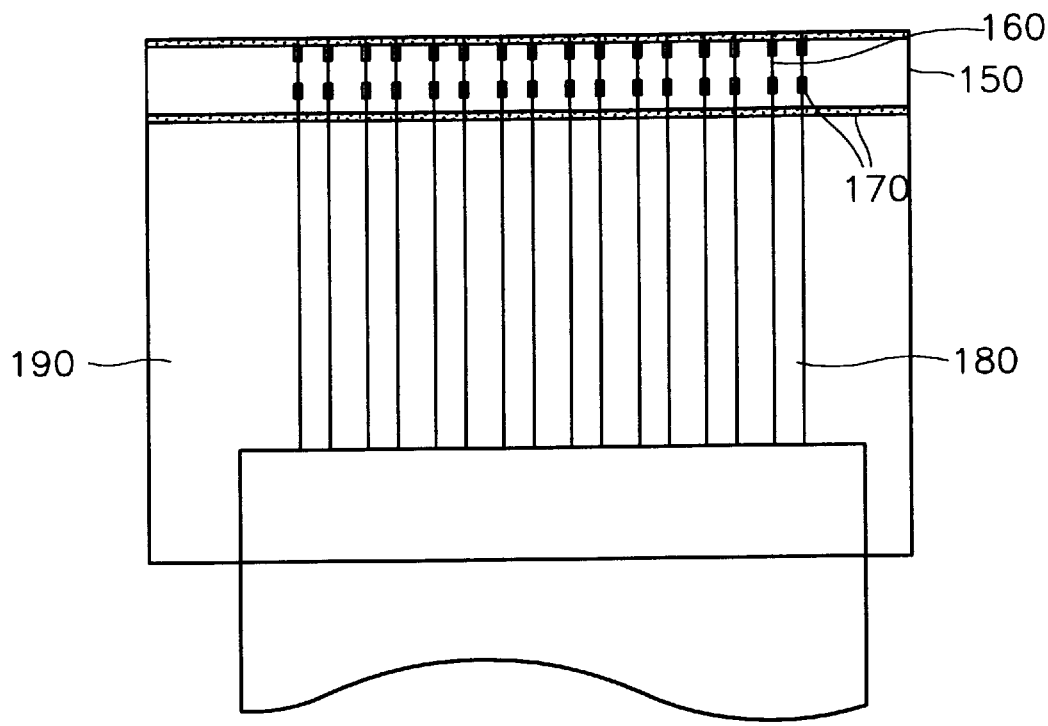
FIGS. 7A and 7B are respectively a plan view and a cross-sectional view of the optical fiber array having optical illuminance provided by polishing its end.

The present invention roughly involves providing a device for fixing optical fibers, and arraying optical fibers and fixing them to the device, thereby constituting an accurate optical fiber array module. The fiber array module according to the present invention includes, as shown in FIG. 7A, a metal substrate 150 having plated holes, a metal-coated fiber array 180, and a fixing unit 190 for fixing the metal substrate 150 to the fiber array 180 whose fibers are inserted into the holes of the metal substrate 150. The metal substrate 150 has holes 160 into which optical fibers can be inserted, at predetennined intervals, and the walls of the holes 160 and the entire surface of the metal substrate 150 are plated with a metal material. A metal layer is deposited on a cladding layer or an external glass layer, exposed by peeling off a first coating, of the fibers of the fiber array 180, which are inserted into the holes 160 formed through the metal substrate 150 plated with metal. The fixing unit 190 fixes the fiber array 180 to the metal substrate 150 with molding compounds, when the optical fibers are arrayed by being inserted into the holes of the metal substrate 150 and heated.

Figure 1A:
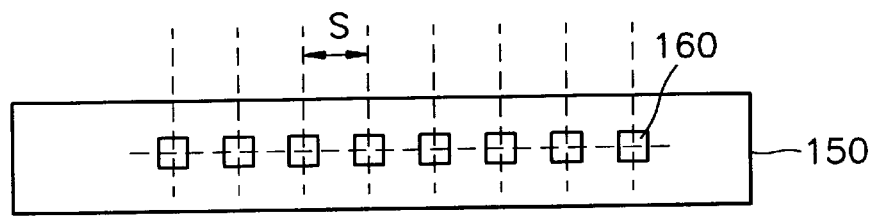
FIGS. 1A and 1B are respectively a cross-sectional view and a plan view of a device in which holes for arraying optical fibers are formed through a substrate, according to a preferred embodiment of the present invention.
Figure 1B:
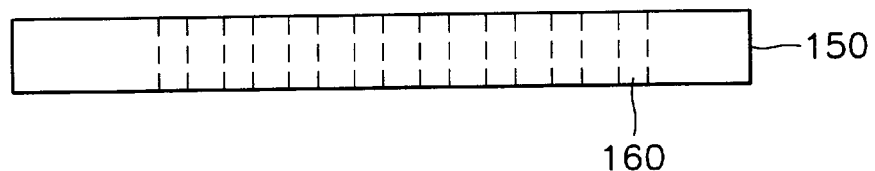

A method of manufacturing the fiber array module will now be described in detail. As shown in FIG. 1, a plane substrate such as a flat silicon wafer, a ceramic board or a metal plate is prepared. Holes are formed at regular intervals in the plane substrate, to array optical fibers. The holes are accurately formed in the substrate by mechanical processing, a laser, a semiconductor exposure and etching process, or a dry etch method using a solution or reactive gas. The holes formed through the substrate are rectangular, circular or polygonal. FIGS. 1A and 1B show holes for arraying optical fibers, formed in a substrate, according to a preferred embodiment of the present invention, wherein FIG. 1A shows the cross-section of the substrate and FIG. 1B is a plan view. Reference numeral 150 is a substrate, and reference numeral 160 is a hole.

Figure 2A:
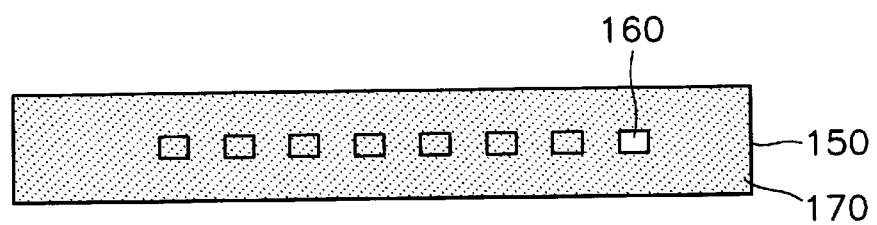
FIGS. 2A and 2B are respectively a cross-sectional view and a plan view of the device of FIG. 1A whose surface and holes are plated with a solder material, according to the preferred embodiment of the present invention.
Figure 2B:
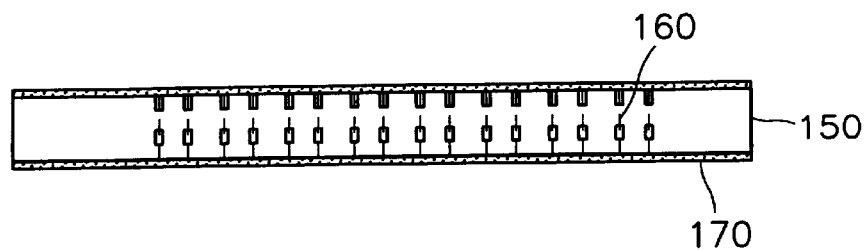

Meanwhile, when the substrate is the silicon wafer or ceramic sheet, a chrome/gold (Cr/Au) metal layer is vacuum-deposited on the walls of the holes and the entire surface of the substrate, to allow the substrate to be plated with solder alloy. When the substrate is a metal plate, such a metal layer is not necessary, and the surface of the substrate needs only to be processed to allow the solder alloy to be effectively attached to the substrate surface. After this process, the holes and the entire surface of the substrate are plated with the solder alloy by electrolytic plating or electroless plating. FIGS. 2A and 2B are respectively a cross-sectional view and a plan view of the device of FIG. 1A whose surface and holes are plated with a solder material, according to the preferred embodiment of the present invention. Reference numeral 170 denotes the solder material with which the substrate 150 is plated.

Figure 3A:
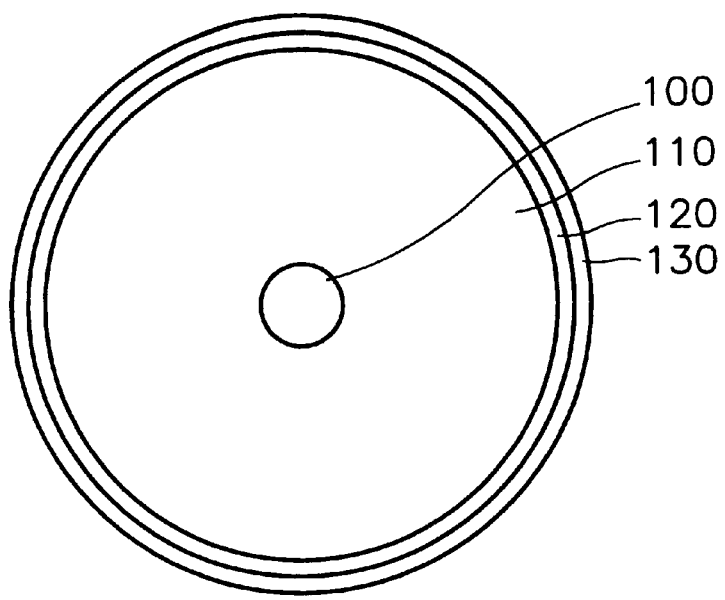
FIGS. 3A and 3B are cross-sectional views of a metal deposited fiber and a copper coated fiber, respectively, according to a preferred embodiment of the present invention.
Figure 3B:
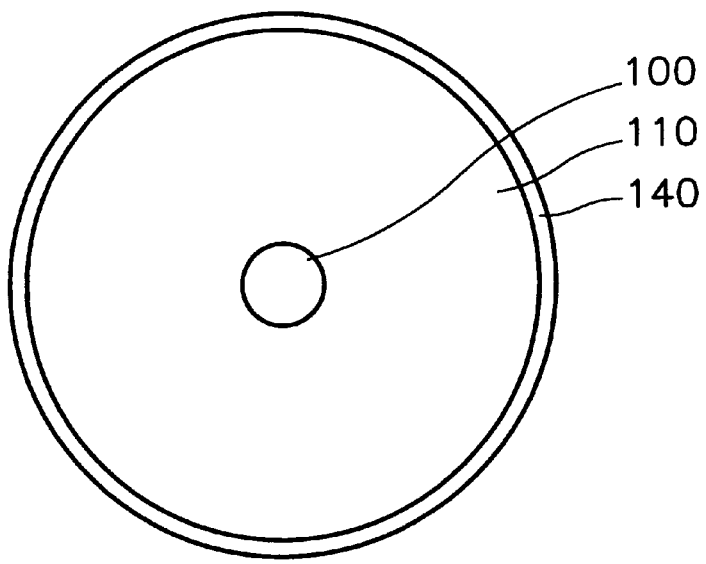

The optical fibers used in the present invention are formed by peeling all coatings off optical fibers and depositing a metal layer such as chrome/gold (Cr/Au), titanium/gold (Ti/Au) or titanium nitride/gold (TiN/Au) on cladding layers of the optical fibers. Also, the optical fibers can be copper coated. Optical fibers to be inserted into the holes in the substrate can be single-core, multi-core and ribbon optical fibers. FIGS. 3A and 3B are cross-sectional views of a metal coated fiber and a copper coated fiber, respectively, according to a preferred embodiment of the present invention. Reference numeral 100 is a core, reference numeral 110 is a cladding layer, reference numerals 120 and 130 are first and second metal layers, and reference numeral 140 is a copper layer.

Figure 4:
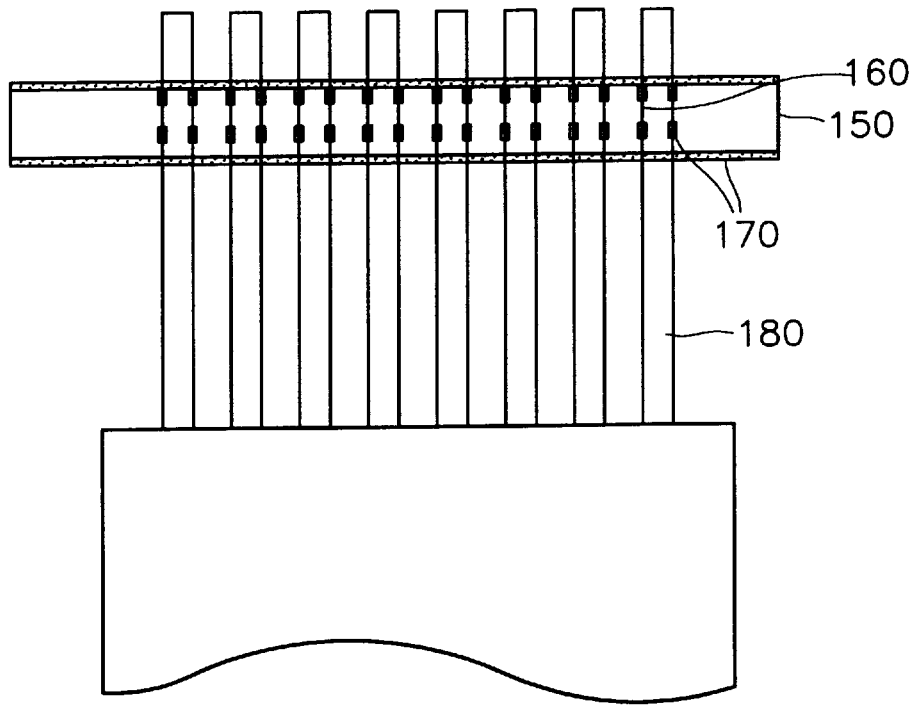
FIG. 4 shows the optical fiber array module in which metal or copper coated optical fibers are inserted through holes in a plated arranging substrate, and the solder material reflows by heat, according to the preferred embodiment of the present invention.
Figure 5A:
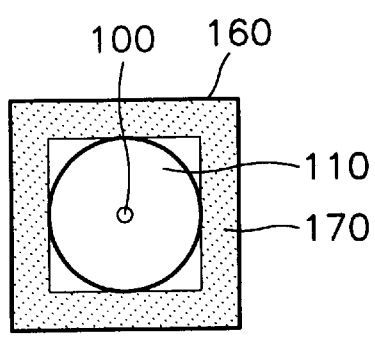
FIGS. 5A and 5B respectively show nonreflowing and reflowing solder materials in a hole.
Figure 5B:
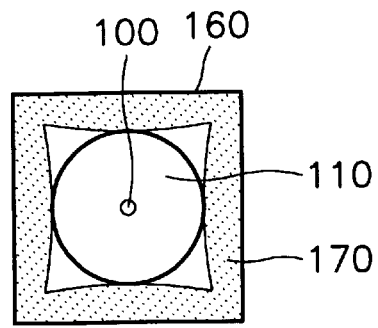

When the optical fibers are prepared, each having a metal layer such as a Cr/Au, Ti/Au or TiN/Au layer, or a copper coating, the optical fibers are inserted into the holes 160 in the substrate 150 plated with solder alloy 170. Thereafter, when the solder alloy material is heated to its melting point or higher, the optical fibers move to the centers of the holes 160 by the surface tension of the solder alloy material. That is, the optical fibers are placed at the center of the holes 160 of the substrate 150 due to a self-alignment effect. FIG. 4 shows a plated arranging substrate 150 according to the preferred embodiment of the present invention in which metal or copper coated optical fibers are inserted through holes 160 and the solder material is heated to reflow. Here, reference numeral 180 is the optical fiber coated with metal. FIGS. 5A and 5B show nonreflowing and reflowing solder materials in the hole 160, respectively.

The holes in the fiber arranging substrate can be perpendicular to the surface of the arranging substrate. Alternatively, they can be angled by 0.1° to 20° to reduce reflection loss or the like occurring, when connecting to an optical waveguide device.

Figure 6:
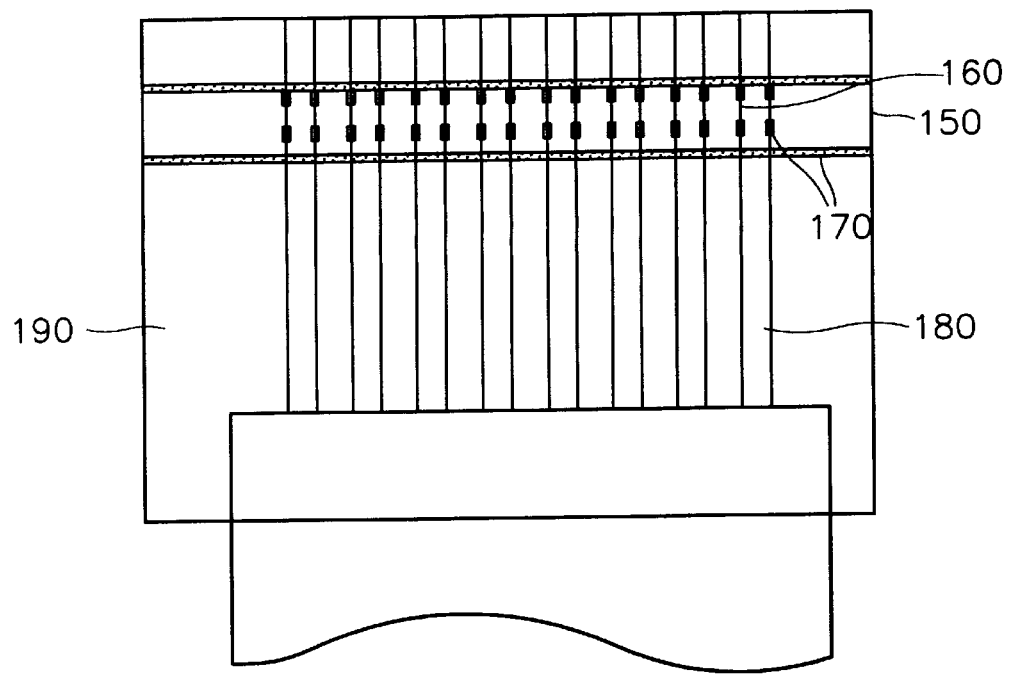
FIG. 6 shows the optical fiber array module according to the preferred embodiment of the present invention and optical fibers, sealed with molding compounds.
Figure 7B:
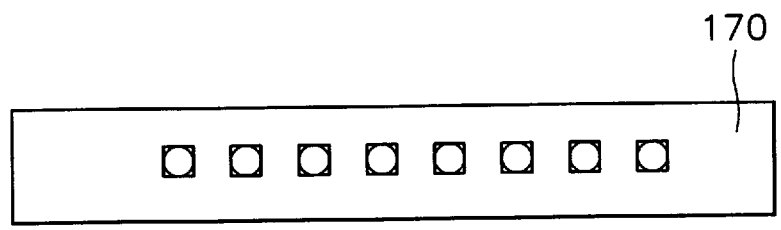

Next, the resultant structure is solidly fixed by epoxy which is cured by heat or ultraviolet rays, and the ends of the optical fibers protruding through the holes 160 are polished to have optical luminance, thereby fabricating a fiber array module capable of being accurately attached to the optical waveguide device. FIG. 6 shows the fiber arranging device according to the preferred embodiment of the present invention, and optical fibers, which are sealed by molding compounds 190. FIGS. 7A and 7B are a plan view and a cross-sectional view of the fiber array of FIG. 6 after the ends of the arrayed fibers are polished to give optical illuminance.

When the multi-core fiber array formed using the structure of the present invention is attached to the optical waveguide device, the area of attached section is enlarged, thus improving is environmental characteristics and reliability of a device package upon the connection of the optical fibers.

Also, the fiber array module is simply manufactured, and the ends of loaded optical fibers are easily polished. A cheap connection module can be fabricated by the simple manufacturing process. The optical fibers are accurately arrayed by self-alignment using the surface tension of the solder material.

Furthermore, since the holes into which the optical fibers are inserted are angled at 0° to 20° with respect to the surface of the substrate, the reflection loss can be reduced when the arrayed optical fibers are connected to the optical waveguide device.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of manufacturing an optical fiber array module using soldering, comprising the steps of:
   forming holes into which optical fibers can be inserted, in one of either a silicon wafer substrate or a ceramic substrate at predetermined intervals;
   forming a metal layer on walls of the holes and an entire surface of the substrate, to facilitate the walls of the holes and the entire surface of the substrate to be plated with a solder alloy material;
   plating the walls of the holes and the entire surface of the substrate with the solder alloy material;
   inserting metal-coated optical fibers into the holes plated with the solder alloy material;
   positioning the optical fibers at the centers of the holes using the surface tension of the solder alloy material, by heating the resultant structure of the substrate and optical fibers;
   fixing the optical fibers, inserted into the holes of the substrate, to the substrate by pouring an epoxy curable by heat or ultraviolet light thereon, to fabricate a fiber array module capable of being accurately attached to an optical waveguide device; and
   polishing an end of the optical fiber module formed of optical fibers protruding through the holes, to provide optical luminance.

2. The method of manufacturing a fiber array module using soldering as claimed in claim 1, the holes in the substrate being formed by a method selected from the group consisting of mechanical processing, laser processing, semiconductor exposure and etching, and dry-etching.

3. The method of manufacturing a fiber array module using, soldering as claimed in claim 1, the metal of the metal layer comprising chrome/gold (Cr/Au).

4. The method of manufacturing a fiber array module using soldering as claimed in claim 3, the chrome/gold (Cr/Au) layer being formed by vacuum deposition.

5. The method of manufacturing a fiber array module using soldering as claimed in claim 1, the walls of the holes and the entire substrate being plated with the solder alloy material by one of either electrolytic plating or electroless plating.

6. The method of manufacturing a fiber array module using soldering as claimed in claim 1, the optical fibers inserted into the holes in the substrate being prepared by peeling all coatings off the optical fibers and depositing metal on cladding layers of the optical fibers.

7. The method of manufacturing a fiber array module using soldering as claimed in claim 6, the metal deposited on the optical fibers comprising a metal selected from the group consisting of chrome/gold (Cr/Au), titanium/gold (Ti/Au), and titanium nitride/gold (TiN/Au).

8. The method of manufacturing a fiber array module using soldering as claimed in claim 1, the optical fibers inserted into the holes in the substrate being prepared by depositing metal on external glass layers of the optical fibers.

9. The method of manufacturing a fiber array module using, soldering as claimed in claim 7, the metal deposited on the optical fibers comprising a metal selected from the group consisting of chrome/gold (Cr/Au), titanium/gold (Ti/Au), and titanium nitride/gold (TiN/Au).

10. The method of manufacturing a fiber array module using soldering as claimed in claim 1, the optical fibers inserted into the holes in the substrate comprising copper coated fibers.

11. The method of manufacturing a fiber array module using soldering as claimed in claim 1, the solder alloy material being heated to at least its melting point.

12. The method of manufacturing a fiber array module using soldering as claimed in claim 1, the holes in the substrate being perpendicular to a surface of an arranging device.

13. The method of manufacturing a fiber array module using soldering as claimed in claim 1, the holes in the substrate being at an angle of 0.1° to 20° with respect to a surface of an arranging device.

14. The method of manufacturing a fiber array module using soldering as claimed in claim 1, the holes in the substrate each have a cross-sectional shape selected from the group consisting of a rectangle, a circle, and a polygon.

15. The method of manufacturing a fiber array module using soldering as claimed in claim 1, the optical fibers inserted into the holes in the substrate comprising fibers selected from the group consisting of single-core fibers, multi-core fibers, and ribbon fibers.

16. A method of manufacturing a fiber array module using soldering, comprising the steps of:
   forming holes into which arrayed optical fibers can be inserted, in a metal substrate at predetermined intervals;
   processing walls of the holes in the metal substrate;
   plating the walls of the holes and an entire surface of the substrate with the solder alloy material;
   inserting metal-coated fibers into the holes plated with the solder alloy material;
   positioning the optical fibers at the centers of the holes using the surface tension of the solder alloy material, by heating the resultant structure of the substrate and optical fibers;
   fixing the optical fibers, inserted into the holes of the substrate, to the substrate by pouring an epoxy curable by heat or ultraviolet light thereon, to fabricate a fiber array module capable of being accurately attached to an optical waveguide device; and
   polishing an end of the optical fiber module formed of optical fibers protruding through the holes, to provide optical luminance.

17. The method of manufacturing a fiber array module using soldering as claimed in claim 16, the holes in the substrate being formed by a method selected from the group consisting of mechanical processing, laser processing, semiconductor exposure and etching, and dry-etching.

18. The method of manufacturing a fiber array module using soldering as claimed in claim 16, the walls of the holes and the entire substrate being plated with the solder alloy material by one of either electrolytic plating or electroless plating.

19. The method of manufacturing a fiber array module using soldering as claimed in claim 18, the metal deposited on the optical fibers comprising a metal selected from the group consisting of chrome/gold (Cr/Au), titanium/gold (Ti/Au), and titanium nitride/gold (TiN/Au).

20. The method of manufacturing a fiber array module using soldering as claimed in claim 16, the optical fibers inserted into the holes in the substrate being prepared by peeling all coatings off the optical fibers and depositing metal on cladding layers of the optical fibers.

21. The method of manufacturing a fiber array module using soldering as claimed in claim 20, the metal deposited on the optical fibers comprising a metal selected from the group consisting of chrome/gold (Cr/Au), titanium/gold (Ti/Au), and titanium nitride/gold (TiN/Au).

22. The method of manufacturing a fiber array module using soldering as claimed in claim 16, the optical fibers inserted into the holes in the substrate being obtained by depositing metal on external glass layers of the optical fibers.

23. The method of manufacturing a fiber array module using soldering as claimed in claim 16, the optical fibers inserted into the holes in the substrate comprising copper coated fibers.

24. The method of manufacturing a fiber array module using soldering as claimed in claim 16, the holes in the substrate being perpendicular to a surface of an arranging device.

25. The method of manufacturing a fiber array module using soldering as claimed in claim 16, the holes in the substrate being at an angle of 0.1° to 20° with respect to a surface of an arranging device.

26. The method of manufacturing a fiber array module using soldering as claimed in claim 16, the optical fibers inserted into the holes in the substrate comprising fibers selected from the group consisting of single-core fibers, multi-core fibers, and ribbon fibers.

27. A fiber array module manufactured using soldering, comprising:
   a metal substrate having holes into which optical fibers can be inserted, walls of the holes and an entire surface of the metal substrate being plated with a metal material;
   arrayed optical fibers inserted into the holes in the metal substrate and prepared by depositing metal layers on cladding layers or external glass layers exposed by removing all coatings from the optical fibers; and
   a fixing unit for fixing the arrayed optical fibers to the metal substrate, after the arrayed optical fibers have been inserted into the holes in the metal substrate and aligned by heat.

28. The fiber array module using soldering as claimed in claim 27, the fixing unit fixing the optical fiber array to the substrate using a molding compound.

29. An optical fiber array module, comprising:
   a substrate having a hole of polygonal cross-section for receiving an optical fiber, said hole having walls;
   a solder material plated on the surface of the substrate and the walls of said hole;
   an optical fiber centered in said hole, said optical fiber comprising:
      a cladding layer;
      a metal coating surrounding the cladding layer, said metal coating contacting said solder material tangentially near the walls of the hole.

30. The optical fiber array module of claim 29, said hole having a square cross-section.

* * * * *